United States Patent
Glückler et al.

(10) Patent No.: US 11,760,179 B2
(45) Date of Patent: *Sep. 19, 2023

(54) DRIVE AXLE FOR AN ELECTRIC VEHICLE

(71) Applicant: ZF Friedrichshafen AG, Friedrichshafen (DE)

(72) Inventors: Johannes Glückler, Friedrichshafen (DE); Kai Bornträger, Langenargen (DE); Stefan Spühler, Friedrichshafen (DE); Johannes Kaltenbach, Friedrichshafen (DE); Stefan Renner, Bodman-Ludwigshafen (DE); Michael Trübenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 10 days.

This patent is subject to a terminal disclaimer.

(21) Appl. No.: 17/610,852

(22) PCT Filed: Apr. 8, 2020

(86) PCT No.: PCT/EP2020/059972
§ 371 (c)(1),
(2) Date: Nov. 12, 2021

(87) PCT Pub. No.: WO2020/229060
PCT Pub. Date: Nov. 19, 2020

(65) Prior Publication Data
US 2022/0250457 A1 Aug. 11, 2022

(30) Foreign Application Priority Data
May 14, 2019 (DE) .................. 10 2019 206 957.6

(51) Int. Cl.
*B60K 17/04* (2006.01)
*B60K 1/02* (2006.01)

(52) U.S. Cl.
CPC .............. *B60K 1/02* (2013.01); *B60K 17/046* (2013.01)

(58) Field of Classification Search
CPC ........ B60K 1/02; B60K 17/046; B60K 17/06; B60K 17/08; B60K 7/0007; B60K 2007/0061
See application file for complete search history.

(56) References Cited

U.S. PATENT DOCUMENTS 4,330,045 A * 5/1982 Myers ..................... F16D 55/22
475/900
9,096,126 B2 8/2015 Knoblauch
(Continued)

FOREIGN PATENT DOCUMENTS

CN 108297683 A * 7/2018
CN 109109650 A * 1/2019
(Continued)

OTHER PUBLICATIONS

German Search Report Corresponding to 10 2019 206 957.6 dated Dec. 2, 2020.
(Continued)

*Primary Examiner* — Justin Holmes
(74) *Attorney, Agent, or Firm* — Finch & Maloney PLLC

(57) ABSTRACT

A drive axle for an electric vehicle which comprises first and second electric machines (EM1, EM2), first and second drive wheels (R1, R2) and first and second two-speed transmissions (G1, G2) each having the same gear ratios. The first electric machine (EM1) drives the first drive wheel (R1) by way of the first two-speed transmission (G1) and the second electric machine (EM2) drives the second drive wheel (R2) by way of the second two-speed transmission (G2). The first and the second two-speed transmissions (G1, G2) each comprise a first planetary gearset (PS1) and a second planetary gearset (PS2) coupled to one another. The
(Continued)

first planetary gearset (PS1) and the second planetary gearset (PS2) each comprise a web shaft (ST1, ST2), a ring-gear shaft (HR1, HR2) and a sun-gear shaft (SO1, SO2).

19 Claims, 4 Drawing Sheets

(56) References Cited

U.S. PATENT DOCUMENTS

| | | | |
|---|---|---|---|
| 9,868,349 | B2 | 1/2018 | Pritchard et al. |
| 10,927,934 | B2 * | 2/2021 | Zheng .................... B60K 17/16 |
| 11,124,064 | B2 * | 9/2021 | Kaltenbach .............. B60K 1/00 |
| 11,135,914 | B2 * | 10/2021 | Glückler et al. ......... B60K 1/02 |
| 2014/0256493 | A1 | 9/2014 | Knoblauch |
| 2019/0390762 | A1 | 12/2019 | Paulik et al. |

FOREIGN PATENT DOCUMENTS

| | | |
|---|---|---|
| DE | 197 09 577 A1 | 10/1998 |
| DE | 10 2009 002 437 A1 | 10/2010 |
| DE | 10 2011 056 047 A1 | 6/2013 |
| DE | 10 2016 223 747 A1 | 5/2018 |
| DE | 10 2017 211 881 A1 | 1/2019 |
| EP | 2 450 597 A1 | 5/2012 |

OTHER PUBLICATIONS

International Search Report Corresponding to PCT/EP2020/0599972 dated Jun. 19, 2020.
Written Opinion Corresponding to PCT/EP2020/0599972 dated Jun. 19, 2020.

* cited by examiner

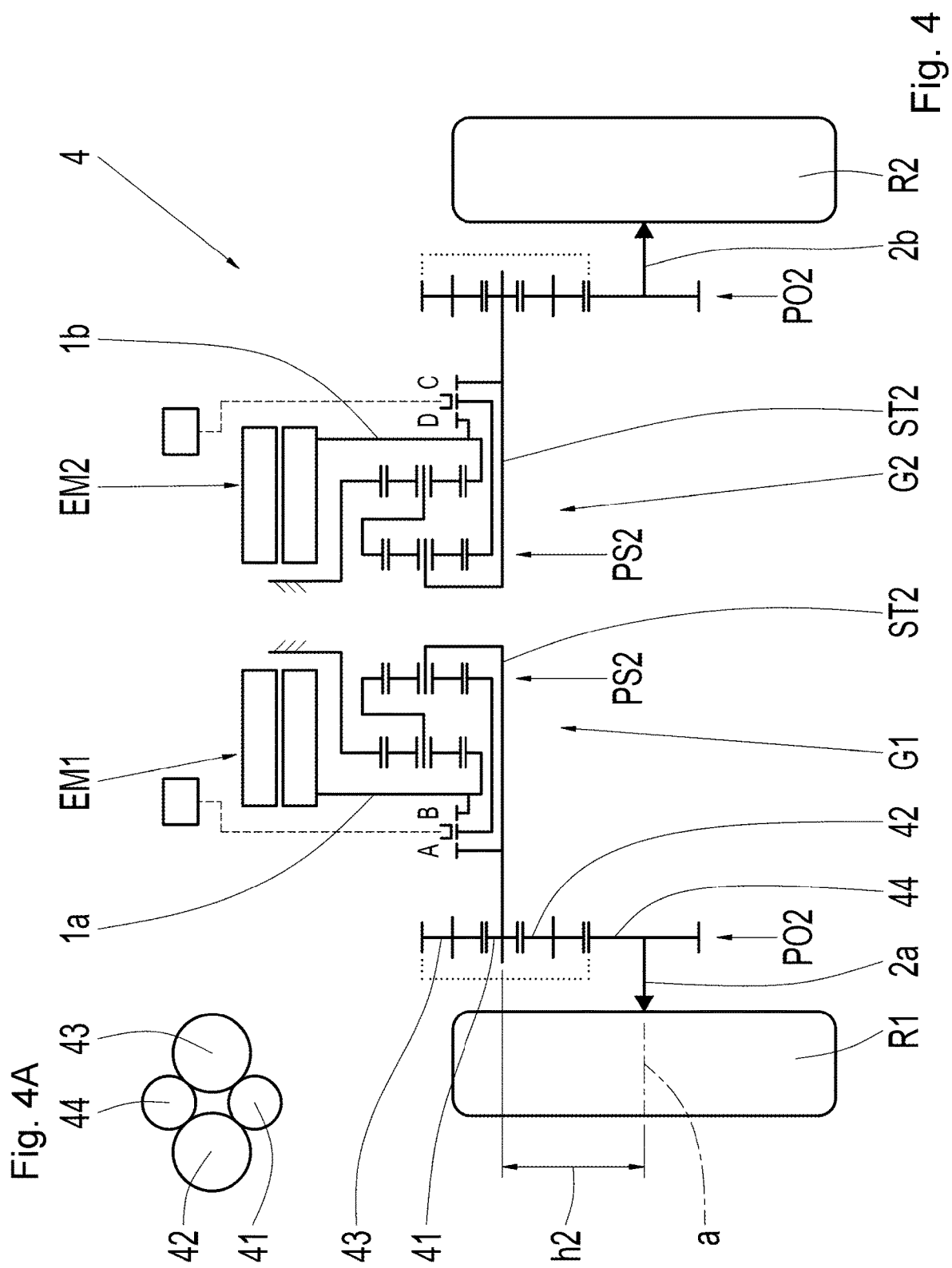

DRIVE AXLE FOR AN ELECTRIC VEHICLE

This application is a National Stage completion of PCT/EP2020/059972 filed Apr. 8, 2020, which claims priority from German patent application serial no. 10 2019 206 957.6 filed May 14, 2019.

FIELD OF THE INVENTION

The invention relates to a drive axle for an electrically driven vehicle, comprising a first and a second electric machine with driveshafts, a first and a second drive wheel, and a first and a second two-speed transmission with the same gear ratios, wherein the first electric machine drives the first drive wheel by way of the first transmission and the second electric machine drives the second drive wheel by way of the second transmission.

BACKGROUND OF THE INVENTION

From DE 10 2009 002 437 A1 a purely electrically driven vehicle in several variants has become known, wherein a variant, according to FIG. 2, comprises a purely electrically driven rear axle with individual wheel drives, i.e., a so-called wheel-specific drive. Associated with each drive wheel there is an electric machine with a downstream transmission, and the two individual wheel drives are separate from one another. The transmissions are designed as two-speed transmissions and are engaged by way of a claw-type shift, i.e., during the shifting process a traction force interruption takes place. For example, if only the transmission on the right-hand side, which drives the right-hand wheel, is shifted, then owing to the traction force interruption at the right-hand wheel, a yaw torque is produced about the vertical axis of the vehicle, which tries to steer the vehicle to the right. The shifts are, therefore, carried out simultaneously on both sides to avoid such a yaw torque. On the other hand, a yaw torque may be desirable, for example, when driving round a curve, in order to improve the agility of the vehicle. In such a case, the yaw torque can be produced in a controlled manner by a different torque distribution on the right- and left-hand drive wheels (this being known as torque-vectoring).

SUMMARY OF THE INVENTION

A purpose of the present invention is, with an electrically driven vehicle of the type mentioned to begin with, to arrange the drive components, i.e., the electric machines and the transmissions, in a space-saving and weight-saving manner in the area of the drive axle.

The invention embodies the characteristics specified in the independent claim(s). Advantageous design features emerge from the subordinate claims.

According to the invention, two independent drive-trains are provided, in a drive axle for an electric vehicle, each comprising an electric machine and a two-speed transmission for driving, respectively, one wheel, on the right-hand side, and one wheel, on the left-hand side. The two transmissions are identical, i.e., they have the same gear ratios and are arranged mirror-symmetrically relative to a central plane. The first and the second transmissions each comprise a first and a second shiftable planetary gearset, each of them designed as an epicyclic transmission with three shafts, namely, a web shaft, a ring-gear shaft and a sun-gear shaft. The two planetary gearsets are coupled to one another, i.e., the first and the second planetary gearset form a coupling linkage with which two gears, in each case, can be engaged. The gear ratios serve to step down the rotation speed of the electric machines to the rotation speed of the drive wheels. In that way, a larger torque is produced at the drive wheel and a larger speed range is produced for the vehicle. The wheel-specific drive, according to the invention, enables the function of torque vectoring.

In a preferred embodiment, the web shaft of the first planetary gearset is coupled to the ring-gear shaft of the second planetary gearset, i.e., the two are permanently connected. The web shaft and the ring-gear shaft form a common shaft, the coupling shaft, by which the two planetary gearsets are kinematically coupled with one another to form a coupling linkage.

According to a further preferred embodiment, the sun-gear shafts of the first planetary gearsets are, in each case, driven by an electric machine, i.e., the sun-gear shafts are each permanently connected to the driveshafts of the electric machines, also called E-machines for short.

In a further preferred embodiment, the ring-gear shaft of the first planetary gearset is held fixed, i.e., permanently connected to the housing.

According to a further preferred embodiment, the web shafts of the second planetary gearsets form the drive output shafts of the two two-speed transmissions. Each drive output shaft drives, directly or indirectly, a drive wheel of the electric vehicle.

In another preferred embodiment, the first gear is engaged by "blocking" the second planetary gearset, i.e., two of the three shafts of the second planetary gearset are coupled to one another. As a result, the second planetary gearset rotates as a block, which corresponds to a gear ratio of 1:1 and gives rise to reduced losses.

According to a further preferred embodiment, the first gear can be engaged by coupling the web shaft with the sun-gear shaft of the second planetary gearset, so that the second planetary gearset rotates as a block. The advantage of block rotation is that losses are reduced.

In a further preferred embodiment, the second gear is engaged by coupling the sun-gear shaft of the first planetary gearset with the sun-gear shaft of the second planetary gearset. As a result the two planetary gearsets are coupled with one another by way of two shafts—so producing superposition operation.

According to another preferred embodiment, the two planetary gearsets are exchanged in their positions on the wheel axle, i.e., the first planetary gearsets are arranged in the immediate area of the central plane.

In a further preferred embodiment, the first gear can be engaged by blocking the second planetary gearset, in that the sun-gear shaft and the ring-gear shaft are coupled with one another.

According to another preferred embodiment, the ring-gear shafts of the two internally located first planetary gearsets are supported together on the housing. This saves fitting space in the axial direction.

In a further preferred embodiment, the first and second gears can be engaged by means of shifting elements that can be actuated by actuators. With each transmission there are associated two shifting elements, preferably arranged mirror-symmetrically relative to the central plane.

According to a further preferred embodiment, the E-machines and the planetary gearsets are arranged coaxially with the wheel axis, in such a manner that the planetary gearsets and the two-speed transmissions can be arranged radially inside the rotors. This gives the advantage of a very compact structure, in which the essential drive components are arranged around the wheel axis.

In another preferred embodiment, in each case a constant-ratio stage is arranged in the area of the first and the second drive wheel there, which is in each case connected downstream from the transmission on the right-hand and left-hand sides and provides a further gear ratio in the slow range. In that way, the gear ratios of the first or the second gear of the transmission are multiplied, respectively, by the ratio of the said constant-ratio stage.

According to a further preferred embodiment, the constant-ratio stage is designed as a third planetary gearset with a driving sun-gear shaft, a driven web shaft and a ring-gear shaft which is held fixed, wherein the driving sun-gear shaft is connected to the driven web shaft of the second planetary gearset and the driven web shaft of the third planetary gearset is connected to the drive wheel. Thanks to the coaxial structure of the third planetary gearset, this can preferably be integrated in the drive wheel, in particular in its wheel hub.

In another preferred embodiment, the constant-ratio stage is designed as a portal stage, wherein the drive input shaft and the drive output shaft are axially offset. Due to the axial offset, the rotation axes of the E-machines are displaced upward relative to the wheel axles and this allows a larger ground clearance for the electric vehicle. This design of the drive axle is also known as a portal axle.

According to a further preferred embodiment, the portal stage has a web with planetary gearwheels, a sun gear and a ring gear, wherein the web is held fixed and the drive output on the drive wheel of the stationary transmission takes place by way of the ring gear. As a result of the planetary gearwheels, of which at least two are arranged at the circumference, there is a power partition from the drive input side to the drive output side.

In a further preferred embodiment, the portal stage is designed as a spur gear transmission with a drive input gearwheel, two intermediate gearwheels and a drive output gearwheel, wherein the intermediate gearwheels mesh both with the drive input gearwheel and with the drive output gearwheel. By virtue of the intermediate gearwheels, the axis separation is increased, on the one hand, and the power flow from the drive input to the drive output is split, on the other hand.

According to another preferred embodiment, the E-machines comprise rotors within which the planetary gearsets are arranged. In that way, the hollow space inside the rotors is used to the best effect as fitting space for the two-speed transmissions.

BRIEF DESCRIPTION OF THE DRAWINGS

Example embodiments of the invention are illustrated in the drawing and will be described in greater detail in what follows, so that from the description and/or the drawing further features and/or advantages can emerge. The drawing shows:

FIG. 4: The drive axle of FIG. 1, but in the form of a portal axle (second version); and FIG. 4A: Depicts the four gearwheels, of FIG. 4, as viewed in the axial direction.

DETAILED DESCRIPTION OF THE PREFERRED EMBODIMENTS

Figure 1:
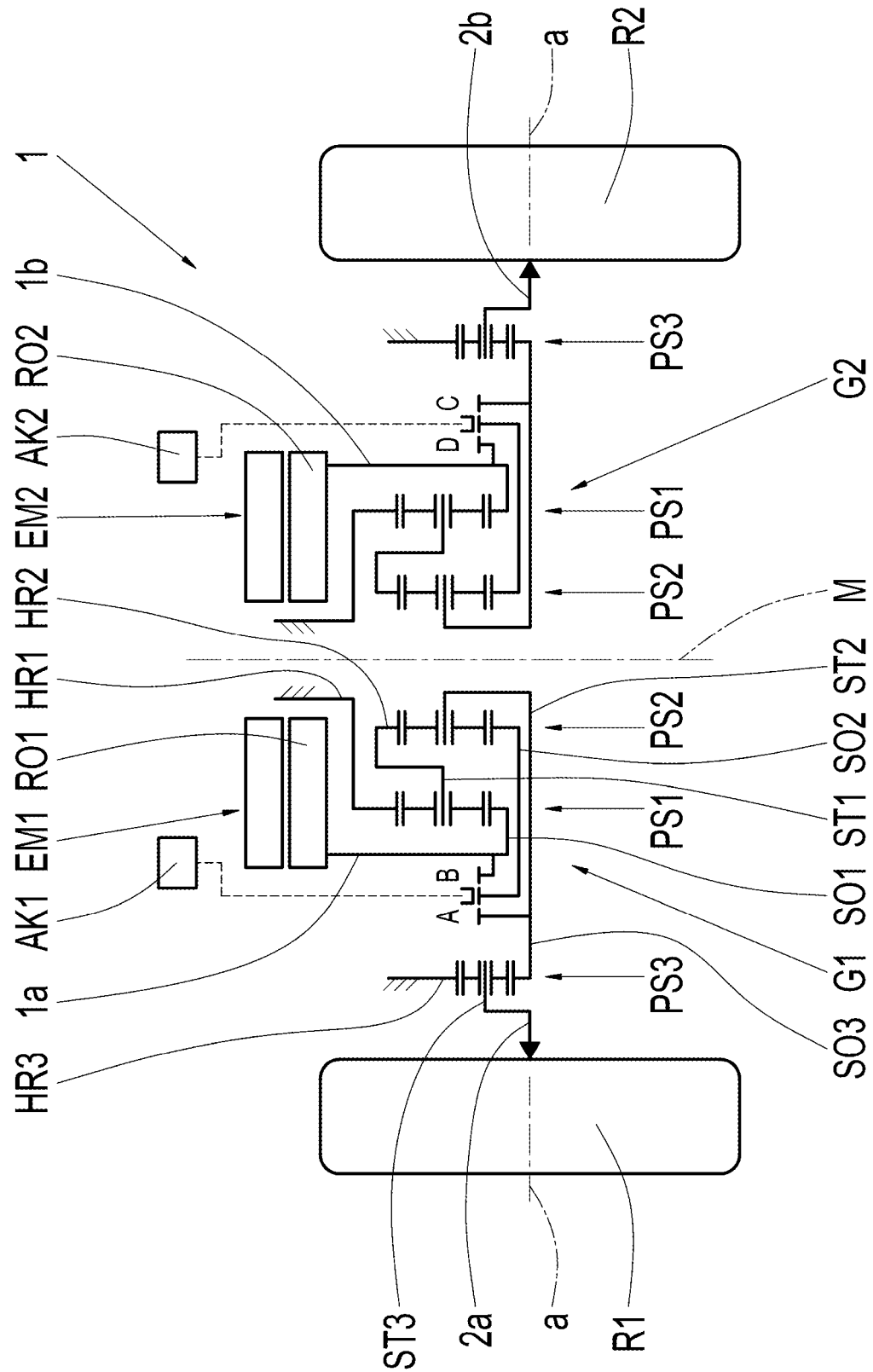
FIG. 1: A drive axle of an electric vehicle with a wheel-specific drive and a symmetrical structure of two drivetrains.

FIG. 1 shows, as a first example embodiment of the invention, a drive axle 1 of an electrically driven vehicle, also called an electric vehicle for short in what follows, which has two drive wheels R1, R2 which are driven by a first electric machine EM1, called the E-machine EM1 for short and by a second electric machine EM2, called the E-machine EM2 for short in what follows. The drive wheels R1, R2 and the E-machines EM1, EM2 are arranged coaxially with a rotation axis a, which is identical to the wheel axes a—the drawing shows only the half above the rotation axis a, while the lower half (not shown) is mirror-symmetrical to the upper half. A first power flow between the first E-machine EM1 and the first drive wheel R1, also called the wheel R1 for short in what follows, extends from a driveshaft 1a, which is connected to a first rotor RO1 of the first E-machine EM1, to a first drive output shaft 2a, which is connected to the first wheel R1. Independently of the said first power flow, a second power flow extends from a second driveshaft 1b, of a second rotor RO2 of the second E-machine EM2, to the second drive output shaft 2b, which is connected to the second wheel R2. A first two-speed transmission G1 that comprises a first shiftable planetary gearset PS1 and a second shiftable planetary gearset PS2, as well as a constant-ratio stage PS3 which is in the form of a third planetary gearset PS3 are arranged between the drive input shaft 1a and the drive output shaft 2b. The same analogously applies to the right-hand side of the drawing, which is arranged mirror-symmetrically relative to a central symmetry plane M. For the three planetary gearsets on the right-hand side, the same indexes PS1, PS2, PS3 are used. The planetary gearsets PS1, PS2, PS3, on the right-hand side, are arranged mirror-symmetrically to the planetary gearsets PS1, PS2, PS3, on the left-hand side, i.e., they have the same gear ratios and kinematically the same structure. Thus, the drive axle 1 provides a wheel-specific drive.

The first planetary gearset PS1 and the second planetary gearset PS2 are, in each case, in the form of epicyclic transmissions comprising three shafts, namely, web shafts ST1, ST2, sun-gear shafts SO1, SO2 and ring-gear shafts HR1, HR2. The first planetary gearset PS1 is coupled, by way of its web shaft ST1, to the ring gear shaft HR2 of the second planetary gearset PS2, i.e., connected fast thereto; thus, the two of them PS1, PS2 form a coupling linkage with the coupling shaft ST1/HR2. The sun-gear shaft SO1 of the first planetary gearset PS1 is connected to the drive input shaft 1a, i.e., the first planetary gearset PS1 is driven by the first E-machine EM1. The ring-gear shaft HR1 of the first planetary gearset PS1 is fixed to the housing. The drive output of the coupling linkage takes place by way of the web shaft ST2 of the second planetary gearset PS2. The two planetary gearsets PS1, PS2 are arranged on the wheel axis a next to one another, with the first planetary gearset PS1—as viewed from the central plane M—on the outside and the second planetary gearset PS2 on the inside.

The coupling linkage or the first two-speed transmission G1, also called the first transmission G1 for short, has two shifting elements A, B which can be actuated by a first actuator AK1. Analogously, the second transmission G2 has two mirror-symmetrically arranged shifting elements D, C which can be actuated by a second actuator AK2. The shifting elements A, B, C, D are preferably in the form of unsynchronized claw-type shifting elements, although other known shifting elements, such as frictional shifting elements, can basically also be used.

The description that follows relates only to the left-hand side, i.e., to the power flow from the first E-machine EM1 to the wheel R1. The description analogously applies to the right-hand side, i.e., to the power flow from the second E-machine EM2 to the second drive wheel R2.

As already mentioned, the first planetary gearset PS1 can be driven by the drive input shaft 1a of the first rotor RO1. The shifting element A is engaged to engage the first gear: thereby, the sun-gear shaft SO2 and the web shaft ST2 of the second planetary gearset PS2 are coupled to one another, i.e., the second planetary gearset PS2 is "blocked" and rotates as a block with a gear ratio of 1:1. Since the ring-gear shaft HR1 of the first planetary gearset PS1 is held fixed, the gear ratio of the first gear is determined by the transmission ratio of the driven sun-gear shaft SO1 and the output web shaft ST1 of the first planetary gearset PS1. The drive output from the second planetary gearset PS2 takes place by way of its web shaft ST2 to the third planetary gearset PS3. The first gear gives a first gear ratio in the slow range.

The shifting element B is engaged to engage the second gear. Thereby, the sun-gear shafts SO1, SO2 of the first and second planetary gearsets PS1, PS2 are coupled to one another and a superimposition operation is obtained between the first and second planetary gearsets PS1, PS2. In the second gear, a second gear ratio in the slow range is produced.

The drive output of the second planetary gearset PS2, i.e., the web shaft ST2, is connected to the input of the third planetary gearset PS3, i.e., with its sun-gear shaft SO3. The ring-gear shaft HR3 of the third planetary gearset PS3 is held fixed, and the drive output takes place from the web shaft ST3 to the drive wheel R1, by way of the drive output shaft 2a. The third planetary gearset PS3 is a constant-ratio stage, by virtue of which a further gear ratio in the slow range is produced. Optionally, the third planetary gearset PS3 can be integrated in the wheel hubs of the drive wheels R1, R2.

As already mentioned, the shifting elements A, B, C, D, also called shift positions, are preferably in the form of interlocking shifting elements, in particular, unsynchronized claw-type shifting elements. When shifting, i.e., during a gearshift, a traction force interruption therefore takes place. For example, if on the left-hand side a shift from shift position A (first gear) to shift position B (second gear) is carried out, then synchronization can be achieved by the first E-machine EM1 and to that extent the drawback of the unsynchronized claws can be compensated by the engagement of the first E-machine EM1. Since the drive-train, on the left-hand side, is completely separate from the drive-train on the right-hand side, it is recommended, particularly when the electric vehicle is started off straight ahead, to shift simultaneously on both sides, i.e., in the transmission G1 and in the transmission G2, so that the two drive wheels are always driven at the same rotation speed, i.e., for example, with the shift combinations A and C or B and D. If one were to shift non-simultaneously but with a time delay, then the electric vehicle would be subjected to a yaw torque which it would be necessary to counteract by steering. This is undesirable when starting off straight ahead, but can be advantageous when driving round a curve in order to make the electric vehicle more agile. For example, when accelerating round a curve to the left, either a faster rotation speed can be produced on the drive wheel on the right or a shift can be carried out only on the left. This would assist a curved trajectory to the left, i.e., the electric vehicle would tend to over-steer.

When neither of the shifting elements A and B is engaged, there is a neutral position in which the first E-machine EM1 is decoupled; this applies analogously to the second E-machine EM2 in a neutral position between the shift positions D and C. With the E-machines EM1, EM2 decoupled, the vehicle could roll freely in a so-called coasting mode, i.e., no losses would occur due to the co-rotation of the E-machines.

The first and second planetary gearsets PS1, PS2 are arranged coaxially with the two E-machines EM1, EM2 and radially inside the two rotors RO1, RO2. In that way, the hollow space provided by the rotors RO1, RO2 is filled to the best effect and fitting space in the direction of the rotation axis a is saved.

Figure 2:
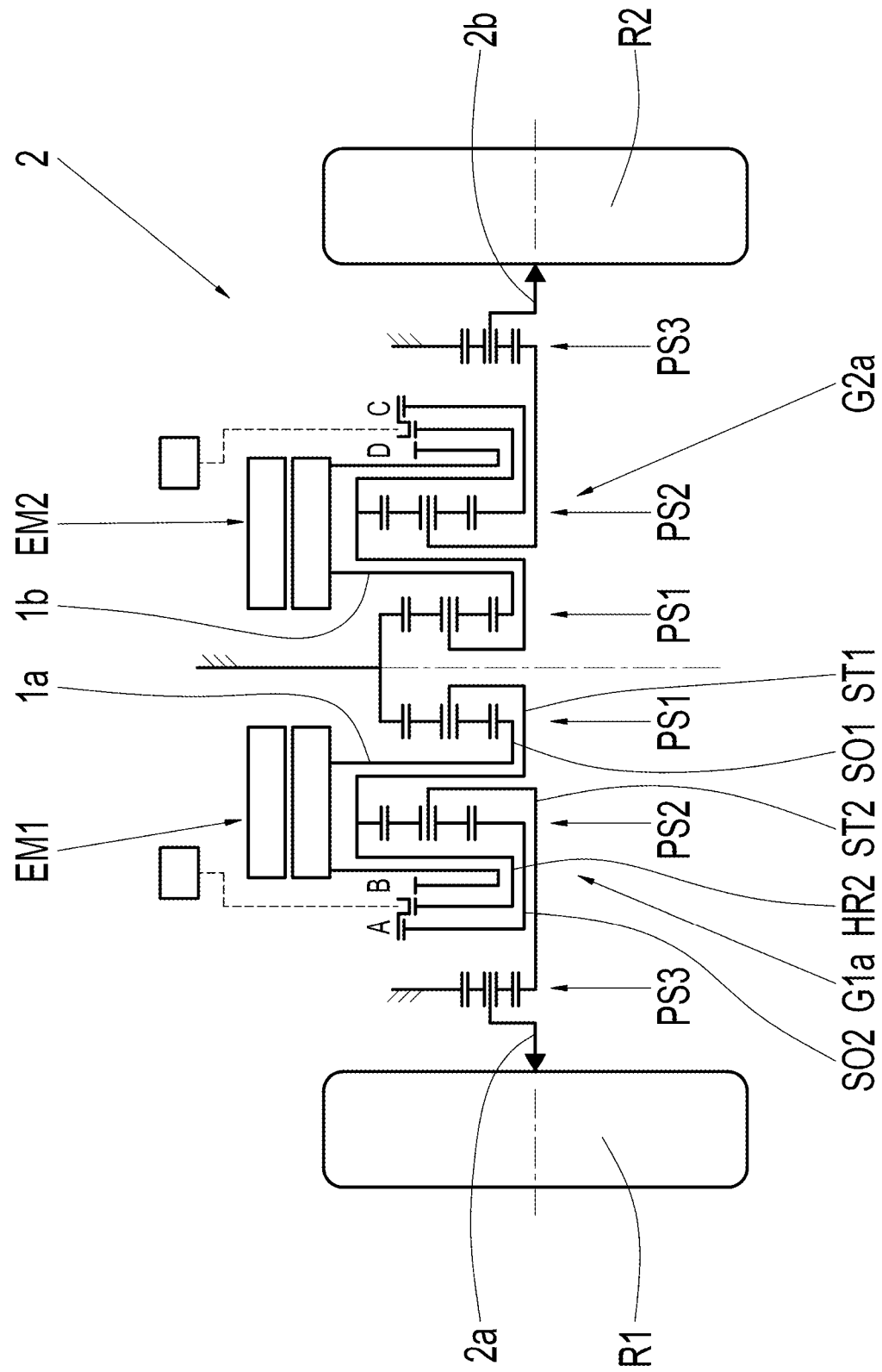
FIG. 2: The drive axle of FIG. 1, but with exchanged planetary gearsets.

FIG. 2 shows, as a second example embodiment of the invention, a drive axle 2 which is a variant of the drive axle 1 according to FIG. 1, in particular of the two-speed transmissions denoted in FIG. 2 by G1a and G2a. The same indexes are used for the same or analogous components. A first difference, compared with the drive axle 1, is that the planetary gearsets PS1, PS2 in the drive axle 2 have exchanged their positions on the wheel axis a; the first planetary gearset PS1 is on the inside, i.e., in the immediate area of the central plane M, while the second planetary gearset PS2 is arranged on the outside. The first planetary gearset PS1 is driven by the driveshaft 1a of the first E-machine EM1 by way of the sun-gear shaft SO1. The drive output takes place via the web shaft ST2 of the second planetary gearset PS2, in this case arranged on the outside. A second difference, compared with the gearset and two-speed transmission G1 according to FIG. 1, is that the first gear is obtained by another coupling of the transmission shafts, namely, by a blocking of the second planetary gearset PS2, which therefore rotates, in first gear, as a block with a gear ratio 1:1. The shifting element A is engaged to form the first gear, whereby the sun-gear shaft SO2 and the ring-gear shaft HR2 of the second planetary gearset PS2 are coupled to one another. The formation of the second gear takes place, as with the drive axle 1 in FIG. 1, by engaged shifting element B, namely, by coupling the sun-gear shaft SO1 of the first planetary gearset PS1 to the sun-gear shaft SO2 of the second planetary gearset PS2. A further difference, compared with the drive axle 1 according to FIG. 1, is that the two ring-gear shafts HR1, of the two internally arranged first planetary gearsets PS1, are together supported on the housing, which saves fitting space. The drive axle 2 is also configured mirror-symmetrically relative to central plane M. The shifting element A, on the left-hand side, corresponds to the shifting element C, on the right-hand side, and the shifting element B corresponds to the shifting element D.

Figure 3:
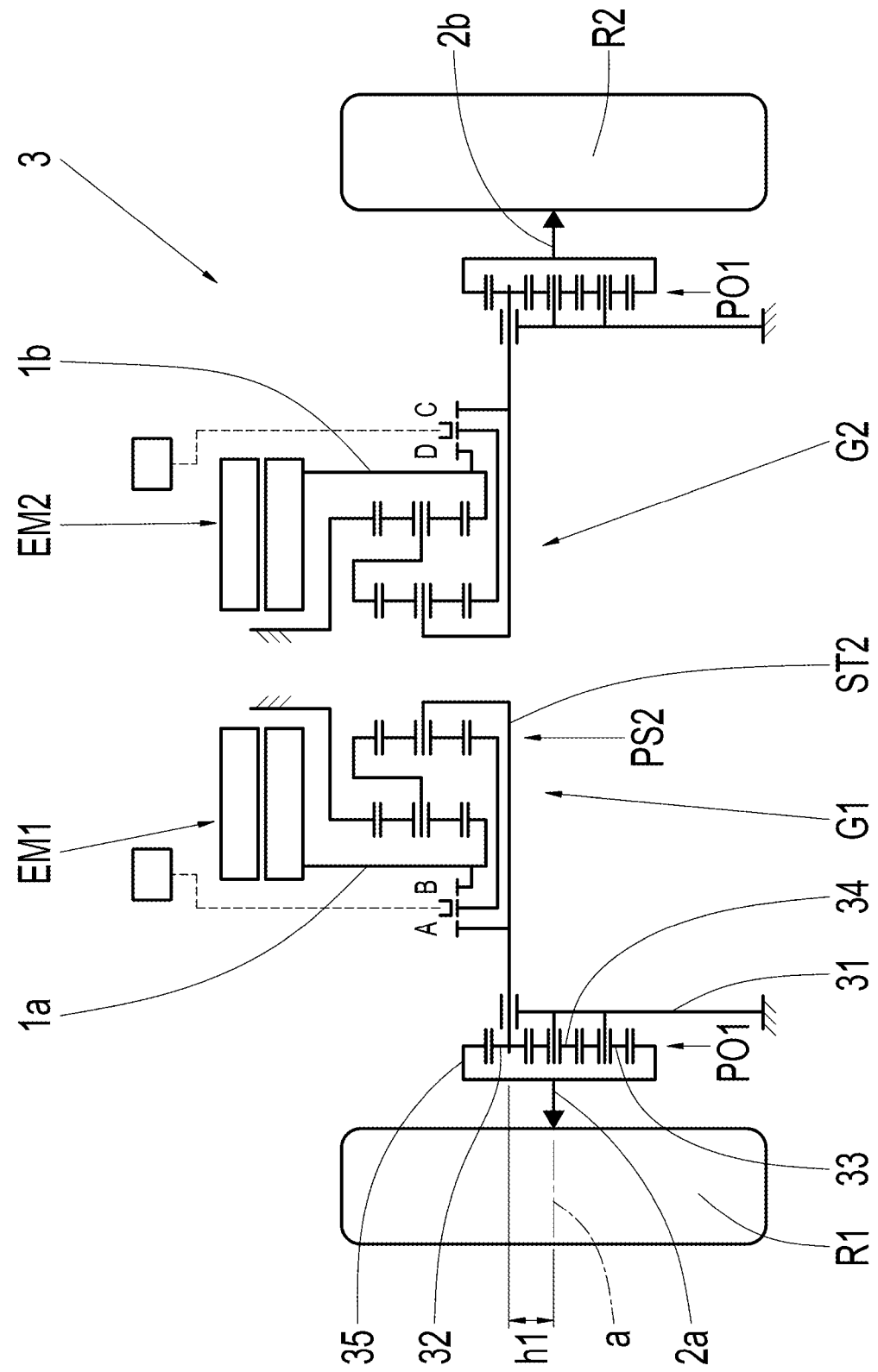
FIG. 3: The drive axle of FIG. 1, but in the form of a portal axle (first version)

FIG. 3 shows, as a third example embodiment of the invention, a drive axle 3 that corresponds to the drive axle 1 according to FIG. 1 in relation to the arrangement of the two E-machines EM1, EM2 and the two-speed transmissions G1, G2. The difference is that the drive axle 3 is designed as a so-called portal axle. The constant-ratio stage, according to FIG. 1 designed as a third planetary gearset PS3, is replaced by a portal stage PO1, to be precise on both sides in the area of the drive wheels R1, R2. The portal stage PO1 is designed as a planetary gearset and comprises a web 31, planetary gearwheels 32, 33 mounted on the web 31, a sun gear 34 and a ring gear 35. The web 31 is arranged fixed on the housing and the planetary gearset, therefore, rotates with a fixed constant gear ratio. The drive input takes place from the web shaft ST2 of the second planetary gearset PS2 to the planetary gearwheel 32. The drive output takes place, via the ring gear 35, to the drive output shaft 2a and from there to the drive wheel R1. The portal stage PO1 has an axis offset h1, between its drive input shaft ST2 and its drive output shaft 2a. This transmission arrangement, with an axis offset, is called a portal axle and, compared with the variants described earlier, it has the advantage of providing greater ground clearance for the vehicle. As a result of the drive input, via the planetary gearwheel 32 and by virtue of further planetary gearwheels at the circumference, the power flow from the drive input to the drive output is split. The portal stage PO1 on the right-hand side, which drives the drive wheel R2 on the right, is configured mirror-symmetrically to the portal stage PO1 on the left and has the same gear ratio in the slow range.

FIGS. 4 and 4a show, as a further example embodiment of the invention, a drive axle 4 that corresponds to the drive axle 3 according to FIG. 3, but has a modified portal stage PO2. The same indexes are used for the same components. The portal stage PO2 is designed as a spur gear transmission and comprises a drive input gearwheel 41 driven by the web shaft ST2 of the second planetary gearset PS2, two intermediate wheels 42, 43, and a drive output gearwheel 44 which drives the wheel R1 by way of the drive output shaft 2a. There is an axial offset h2, between the drive input shaft of the second portal stage PO2, i.e., the web shaft ST2 of the second planetary gearset PS2, and the drive output shaft 2b. For representational reasons, the two intermediate wheels 42, 43 are rotated in the plane of the drawing—and they mesh both with the drive input wheel 41 and with the drive output wheel 44. A depiction, see FIG. 4A, shows the four gearwheels 41, 42, 43 and 44 as viewed in the axial direction: from this it can be seen that, due to the arrangement of the intermediate wheels 42, 43, the axial distance between the drive input gearwheel 41 and the drive output gearwheel 44 is increased. Furthermore, there is a power split due to the two intermediate wheels 42, 43. The second portal stage PO2, on the right-hand side, is configured mirror-symmetrically to the first one on the left-hand side and has the same gear ratio.

The gear ratio of the third planetary gearset PS3, which forms a constant ratio stage, is optional, i.e., the constant ratio stage can be omitted if the two gear ratios of the first and second gears of the transmission Cl, G2 are sufficient.

The two E-machines EM1, EM2 can, in each case, be assembled from a plurality of part-machines, which can also be connected to the drive input shaft 1a or 1b by further transmission elements.

With any of the above-mentioned shafts a permanent brake (such as an eddy-current brake or a hydraulic retarder) can be coupled.

INDEXES

1 Drive axle
1a Drive input shaft (EM1)
1b Drive input shaft (EM2)
2 Drive input axle
2a Drive output shaft
2b Drive output shaft
3 Drive input axle
4 Drive input axle
31 Web (PO1)
32 Planetary gearwheel
33 Planetary gearwheel
34 Sun gear
35 Ring gear
41 Drive input gearwheel (PO2)
42 First intermediate wheel
43 Second intermediate wheel
44 Drive output gearwheel
a Wheel axis
AK1 First actuator
AK2 Second actuator
A, B Shifting elements (G1)
C, D Shifting elements (G2)
EM1 First electric machine
EM2 Second electric machine
G1 First transmission
G2 Second transmission
G1a First transmission
G2a Second transmission
h1 Axial offset (PO1)
h2 Axial offset (PO2)
HR1 Ring-gear shaft (PS1)
HR2 Ring-gear shaft (PS2)
HR3 Ring-gear shaft (PS3)
M Central plane
PO1 First portal stage
PO2 Second portal stage
R1 First (left-hand) drive wheel
R2 Second (right-hand) drive wheel
RO1 First rotor (EM1)
RO2 Second rotor (EM2)
SO1 Sun-gear shaft (PS1)
SO2 Sun-gear shaft (PS2)
SO3 Sun-gear shaft (PS3)
ST1 Web shaft (PS1)
ST2 Web shaft (PS2)
ST3 Web shaft (PS3)
PS1 First planetary gearset
PS2 Second planetary gearset
PS3 Third planetary gearset

The invention claimed is:

1. A drive axle for an electric vehicle comprising:
first and second electric machines,
first and second drive wheels, and
first and second two-speed transmissions having the same gear ratios,
wherein the first electric machine drives the first drive wheel by way of the first two-speed transmission and the second electric machine drives the second drive wheel by way of the second two-speed transmission,
the first and the second two-speed transmissions each comprise a first planetary gearset and a second planetary gearset coupled to the first planetary gearset, and
the first planetary gearset and the second planetary gearset each comprise a web shaft, a ring-gear shaft and a sun-gear shaft.

2. The drive axle according to claim 1, wherein the web shaft of the first planetary gearset is coupled to the ring-gear shaft of the second planetary gearset.

3. The drive axle according to claim 2, wherein the sun-gear shaft of the first planetary gearset is driveable by the first electric machine.

4. The drive axle according to claim 2, wherein the ring-gear shaft of the first planetary gearset is held fixed.

5. The drive axle according to claim 2, wherein the web shafts of the second planetary gearsets form, in each case, a drive output of the first and second two-speed transmissions.

6. The drive axle according to claim 2, wherein a first gear is engaged by blocking the second planetary gearset so that two of the sun-gear shaft, the ring-gear shaft and the web shaft of the second planetary gearset are coupled to one another.

7. The drive axle according to claim 6, wherein the blocking takes place by coupling the sun-gear shaft and the web shaft of the second planetary gearset to each other.

8. The drive axle according to claim 6, wherein a second gear is engaged by coupling the sun-gear shaft of the first planetary gearset to the sun-gear shaft of the second planetary gearset.

9. The drive axle according to claim 1, wherein as viewed in a direction of a wheel axis, the first planetary gearset is arranged inside the second planetary gearset.

10. The drive axle according to claim 9, wherein a first gear is achieved by blocking the second planetary gearset so that the sun-gear shaft thereof is coupled to the ring-gear shaft thereof.

11. The drive axle according to claim 9, wherein the ring-gear shafts of the first planetary gearsets are supported together on the housing.

12. The drive axle according to claim 6, wherein the first and the second two-speed transmissions are each associated with two shifting elements, and the first gears and second gears are engaged by the shifting elements and the shifting elements are actuated by actuators.

13. The drive axle according to claim 1, wherein the first and the second electric machines and the first and the second planetary gearsets are arranged coaxially with a wheel axis.

14. The drive axle according to claim 1, wherein a constant-ratio stage is arranged in an area of the first and the second drive wheels.

15. The drive axle according to claim 14, wherein the constant-ratio stages are respectively designed as a third planetary gearset, each comprising a sun-gear shaft, a web shaft and a ring-gear shaft which is held fixed, and the sun-gear shafts of the third planetary gearsets are connected to the web shafts of the second planetary gearsets and the web shafts of the third planetary gearsets are connected to the first and second drive wheels, respectively.

16. The drive axle according to claim 14, wherein the constant-ratio stages are design as portal stages, each with a drive input shaft and a drive output shaft, and the drive input shafts and the drive output shafts are arranged with an axial offset relative to one another.

17. The drive axle according to claim 16, wherein each of the portal stages comprises a web with planetary gearwheels, a sun gear and a ring gear, the web is held fixed, drive input takes place by way of one of the planetary gearwheels and drive output takes place by way of the ring gear.

18. The drive axle according to claim 16, wherein each of the portal stages comprises a drive input gearwheel, two intermediate gearwheels and a drive output gearwheel, and the intermediate wheels both mesh with the drive input gearwheel and also with the drive output gearwheel.

19. The drive axle according to claim 13, wherein the first and the second electric machines comprise rotors and the first planetary gearsets and/or the second planetary gearsets are at least partially arranged inside the rotors (RO1, RO2).

* * * * *